No. 748,201. PATENTED DEC. 29, 1903.
B. F. D. MILLER.
ANIMAL TRAP.
APPLICATION FILED DEC. 22, 1902.
NO MODEL.
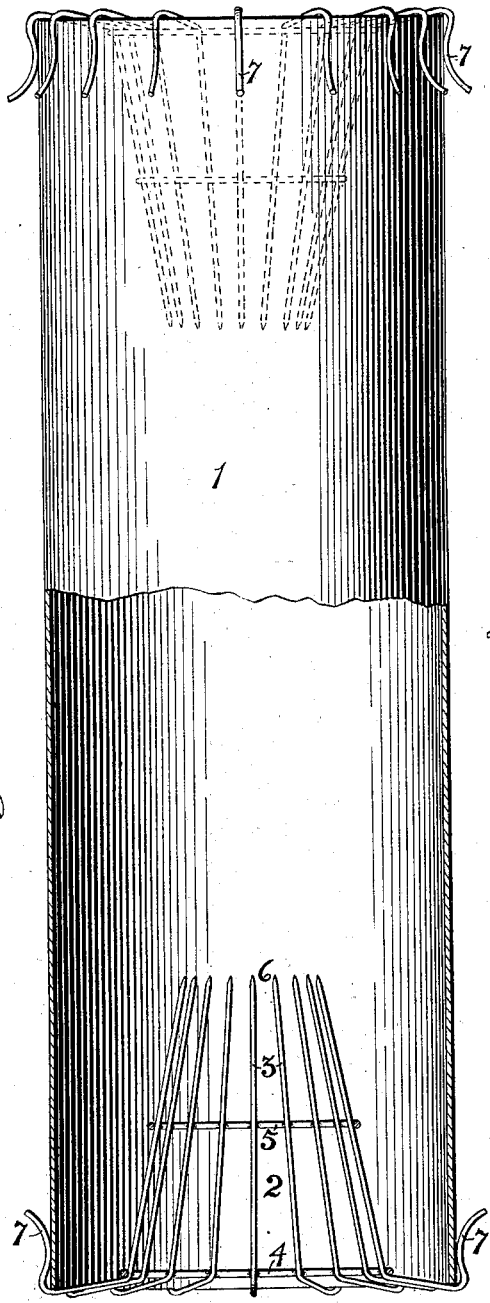
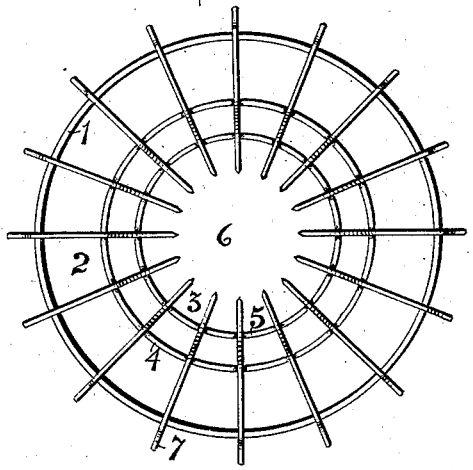
Witnesses:
Matt Young
E. B. Maxwell
Inventor
Benjamin F. D. Miller
By Obed C. Billman, His Atty.

No. 748,201. Patented December 29, 1903.

UNITED STATES PATENT OFFICE.

BENJAMIN F. D. MILLER, OF WOOSTER, OHIO, ASSIGNOR TO GEORGE J. KREIGER, JR., AND DANIEL HELLER, OF WOOSTER, OHIO.

ANIMAL-TRAP.

SPECIFICATION forming part of Letters Patent No. 748,201, dated December 29, 1903.

Application filed December 22, 1902. Serial No. 136,292. (No model.)

*To all whom it may concern:*

Be it known that I, BENJAMIN F. D. MILLER, a citizen of the United States, residing at Wooster, in the county of Wayne and State of Ohio, have invented certain new and useful Improvements in Animal-Traps, of which the following is a specification.

My invention relates to improvements in animal-traps; and it has for its primary object the construction of a generally-improved device of this class which will be exceedingly simple in construction, inexpensive of manufacture, and efficient in use.

With this end in view the invention consists in the novel construction hereinafter described, illustrated in the accompanying drawings, and particularly pointed out in the appended claims.

The invention consists, essentially, of an attachment made up of a number of wires bent in the form shown and described and designed to be attached to the ends of a stovepipe, tile, or any other suitable and convenient cylindrical body.

Referring now to the accompanying drawings, forming a part of this specification, Figure 1 is a view of a cylindrical body, partly in section, having its ends provided with my improved attachment. Fig. 2 is an end view of the same.

In the drawings, 1 designates the cylindrical body carrying in its ends my improved attachment 2. As shown, this attachment is made up of a series of wires 3, arranged in circular form and attached to and held in position by two supporting-rings 4 and 5, forming a central inwardly-extending opening 6. The outer supporting-ring 4 being of larger diameter than the inner supporting-ring 5, the opening 6 is consequently larger in diameter at its outer or receiving portion than at its inner or terminating portion.

It will be observed that the attachment is made up of sixteen wires 3 in the present instance, and each one of these wires is soldered or securely attached to the supporting-rings 4 and 5 in any suitable and convenient manner. The lower or base ends of the wires 3 are bent outwardly from the supporting-ring 5 and are then bent upwardly and outwardly to form a series of spring-arms 7, adapted to form a seat for and receive the end of the cylindrical body 1. It will thus be seen that when a cylindrical body 1 is provided at its ends with my improved attachment 2, as shown in Fig. 1, a simple and efficient "animal-trap" is provided.

The operation of the invention is as follows: Any suitable baiting may be introduced into the cylinder midway of its ends, if necessary or desirable, and the animal will enter through the central inwardly-extending opening 6, and having once entered the animal is unable to find its way out.

If desired, the cylindrical portion 1 may be made up of wire-netting or other suitable material, wherethrough the animal may be seen, and the same sold with attachments, making a complete animal-trap.

Having thus described my invention, what I claim, and desire to secure by Letters Patent, is—

1. In an animal-trap, an attachment for the end of a cylindrical body, consisting of a series of wires arranged in circular form, and forming a central inwardly-extending opening formed by said wires, supporting-rings attached to said series of wires, and a series of spring-arms formed at the base ends of said wires and adapted to receive and clamp over the end of said cylindrical body.

2. An attachment for animal-traps of cylindrical form, consisting of a series of wires arranged in circular form, providing a central inwardly-extending opening, and bent at their base ends to form a series of spring-arms adapted to clamp over the end of a suitable cylindrical body whereby said attachment is held in proper position.

3. In an attachment for animal-traps of cylindrical form, the combination with a series of wires arranged in circular form, providing a central inwardly-extending opening; of a series of spring-arms, formed at the base ends of said wires, adapted to clamp over the end of a suitable cylindrical body.

In testimony whereof I have signed my name in the presence of two subscribing witnesses.

BENJAMIN F. D. MILLER.

Witnesses:
ANNA M. GRAETER,
T. W. ORR.